(12) United States Patent
Lee et al.

(10) Patent No.: US 7,242,165 B2
(45) Date of Patent: Jul. 10, 2007

(54) CHARGER/CRADLE COMBINATION DEVICE FOR PORTABLE TERMINAL

(75) Inventors: Jong-Seong Lee, Seoul (KR); Bum-Soo Park, Gwangmyeong-si (KR)

(73) Assignee: Samsung Electronics Co., Ltd. (KR)

( * ) Notice: Subject to any disclaimer, the term of this patent is extended or adjusted under 35 U.S.C. 154(b) by 317 days.

(21) Appl. No.: 10/924,329

(22) Filed: Aug. 23, 2004

(65) Prior Publication Data

US 2005/0083012 A1 Apr. 21, 2005

(30) Foreign Application Priority Data

Oct. 15, 2003 (KR) ..................... 10-2003-0071773

(51) Int. Cl.
*H01M 10/46* (2006.01)
(52) U.S. Cl. ..................................... 320/115
(58) Field of Classification Search ................ 320/107, 320/114, 115
See application file for complete search history.

(56) References Cited

U.S. PATENT DOCUMENTS

| | | | |
|---|---|---|---|
| 4,575,033 A | 3/1986 | Henneberg et al. | |
| 5,828,966 A * | 10/1998 | Davis et al. | ................. 455/573 |
| 6,256,193 B1 | 7/2001 | Janik et al. | |
| 2001/0006336 A1 | 7/2001 | Yi et al. | |
| 2002/0107043 A1 | 8/2002 | Adamson et al. | |
| 2003/0064751 A1 | 4/2003 | Charlier et al. | |

FOREIGN PATENT DOCUMENTS

| EP | 1 286 246 | 2/2003 |
|---|---|---|
| WO | WO 2004/104803 | 12/2004 |

* cited by examiner

*Primary Examiner*—Edward H. Tso
(74) *Attorney, Agent, or Firm*—The Farrell Law Firm

(57) ABSTRACT

Disclosed is a charger/cradle combination device for a portable terminal. The charger/cradle combination device includes: a supporter; a sliding housing inclinedly engaged on the supporter; sliding means for rendering the inclined grade of the sliding housing to increase/decrease as the sliding housing is upwardly/downwardly moved on the supporter; a cradle housing mounted on the sliding housing in such a manner that the cradle housing is in confronting relation with the sliding housing, the sliding means rendering the inclined grade of the cradle housing to increase or decrease as the cradle housing upwardly or downwardly moves; and a holding device provided on the cradle housing for preventing a portable communication device cradled on the cradle housing from shaking.

23 Claims, 8 Drawing Sheets

CHARGER/CRADLE COMBINATION DEVICE FOR PORTABLE TERMINAL

PRIORITY

This application claims priority to an application entitled "Charger/Cradle Combination Device for Portable Terminal" filed with the Korean Industrial Property Office on Oct. 15, 2003 and assigned Ser. No. 2003-71773, the contents of which are hereby incorporated by reference.

BACKGROUND OF THE INVENTION

1. Field of the Invention

The present invention relates to a charger/cradle combination device for portable digital communication apparatuses, such as cellular phones, PDAs (personal digital assistants), HHPs (hand held phones), and PCS (personal communication service) phones, and more particularly to a charger/cradle combination device for portable terminals or sliding-type portable digital communication apparatuses, wherein the charger/cradle combination device is provided with a housing capable of performing combined sliding and swing operations.

2. Description of the Related Art

In general, a "portable communication apparatus" refers to an electronic apparatus which a user can carry with him/her to perform wireless communication with a desired partner. In consideration of portability, designs of such portable communication apparatuses have tended not only toward compactness, slimness, and lightness, but also toward providing greater multimedia availability, incorporating a wider variety of functions. In particular, future portable communication apparatuses are expected to incorporate greater multi-functionality while being more compact and lighter, and also will be modified to be suitable for various multimedia environments or Internet environments. Additionally, such portable communication apparatuses are now commonly used by all kinds of people, and are recognized by some people as a nearly indispensable commodity which must be carried always.

Conventional portable communication apparatuses may be classified into various types according to their appearance, such as bar-type portable communication apparatuses, flip-type portable communication apparatuses, and folder-type portable communication apparatuses. The bar-type portable communication apparatuses have a single housing shaped like a bar. The flip-type portable communication apparatuses have a flip which is pivotably coupled to a bar-shaped housing by a hinge unit. The folder-type portable communication apparatuses have a folder coupled to a single bar-shaped housing by a hinge unit in such a manner that the folder can be rotated in order to be folded to/unfolded from the housing.

Further, the portable communication apparatuses may be classified into neck wearable type communication apparatuses and wrist wearable type communication apparatuses according to the position at which or the way in which a user puts on the communication apparatuses. The neck wearable type communication apparatus is one which a user wears around the neck using a string or lanyard, while the wrist wearable type communication apparatus is one which a user wears around the wrist.

Additionally, the portable communication apparatuses may be classified into rotation-type communication apparatuses and sliding-type communication apparatuses according to ways of opening and closing the communication apparatuses. In the rotation-type portable communication apparatus, two housings are coupled to each other in such a manner that one housing rotates to be opened or closed relative to the other while they face each other. In the sliding-type portable communication apparatus, two housings are coupled to each other in such a manner that one housing slides to be opened or closed relative to the other. These variously classified portable communication apparatuses can be easily understood by those skilled in the art.

Meanwhile, conventional portable communication apparatuses now have available a function of transmitting data at a high speed in addition to the basic function of performing voice communication. In other words, according to increased demand by consumers, portable communication apparatuses now tend to provide a wireless communication technology capable of transmitting data at a high speed.

Recent portable communication apparatuses also can to be equipped with a camera lens which enables the communication apparatuses to transmit an image signal. That is, current conventional portable communication apparatuses may have an imbedded or external camera lens or a photographing means which enables a user to make an image communication with a desired partner or to take a photograph of a desired subject.

In addition, conventional portable terminals are able to be recharged using a charger when the power source thereof is completely consumed. A separate charger is used to recharge a battery pack for such a portable terminal.

However, in the conventional chargers for conventional portable terminals, there is a problem in that they do not have any additional functions except for a simple charging function. The conventional chargers also have a disadvantage in that they do not allow the position of a portable terminal to be adjusted after the portable terminal has been positioned on the cradle of the charger. In fact, a need exists for a charger constructed in such a manner that if the inclined state of a portable terminal positioned on the cradle of a charger can be adjusted, its utility can be enhanced.

In other words, the whole function of the conventional chargers is merely to recharge a battery pack of a portable terminal by connecting a charger to a power source after the portable terminal is inserted into a slot provided in such a charger. Accordingly, as more PDAs are used with an increased tendency toward multimedia functionality and thus an improved multimedia environment is introduced, there will be a demand for more highly developed multi-functional chargers. In addition, there will be a demand for chargers suitable for various types of portable terminals as mentioned above. In fact, sliding-type or rotatable type portable terminals are expected more common in the future so as to provide the portable terminals with more composite functions. This is because it is expected that a larger display screen will be demanded in portable composite terminals in the future, as well as a space for more keys.

SUMMARY OF THE INVENTION

Accordingly, the present invention has been made to solve the above-mentioned problems occurring in the prior art, and an object of the present invention is to provide a charger/cradle combination device for a portable terminal, which is suitable for a multimedia environment.

Another object of the present invention is to provide a charger/cradle combination device which allows an inclined state of a portable terminal positioned in the cradle of the charger to be adjusted.

Still another object of the present invention is to provide a charger/cradle combination device which makes it convenient to operate the keys of a portable terminal using both hands when the portable terminal is positioned in the cradle of the charger/cradle combination device.

Still another object of the present invention is to provide a charger/cradle combination device which makes it convenient to operate the keys of a portable terminal by rotating a housing of a portable terminal when the portable terminal is positioned on the cradle of the charger/cradle combination device.

Yet another object of the present invention is to provide a charger/cradle combination device suitable for a sliding/rotating type portable terminal.

In order to achieve the above objects, there is provided a charger/cradle combination device for a portable terminal comprising: a supporter; a sliding housing engaged at an inclined angle on the supporter; sliding means for increasing/decreasing an inclined angle of the sliding housing as the sliding housing is moved upwardly/downwardly on the supporter; a cradling housing mounted in confronting relation on the sliding housing, the sliding means increasing/decreasing the inclined angle of the cradling housing as the cradling housing is moved upwardly/downwardly; and a holding device provided on the cradling housing for stabilizing a portable communication device cradled on the cradling housing.

According to the present invention, there is also provided charger/cradle combination device for a portable terminal comprising: a supporter; a sliding housing at an inclined angle engaged on the supporter; sliding means for increasing/decreasing an inclined angle of the sliding housing as the sliding housing is moved upwardly/downwardly on the supporter; a cradling housing mounted in confronting relation on the sliding housing such that an inclined angle of the cradling housing increases/decreases as the cradling housing is moved upwardly/downwardly; and a speaker assembly provided on the cradling housing for stabilizing a portable communication device cradled on the cradling housing, the speaker assembly comprising a plurality of speakers.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
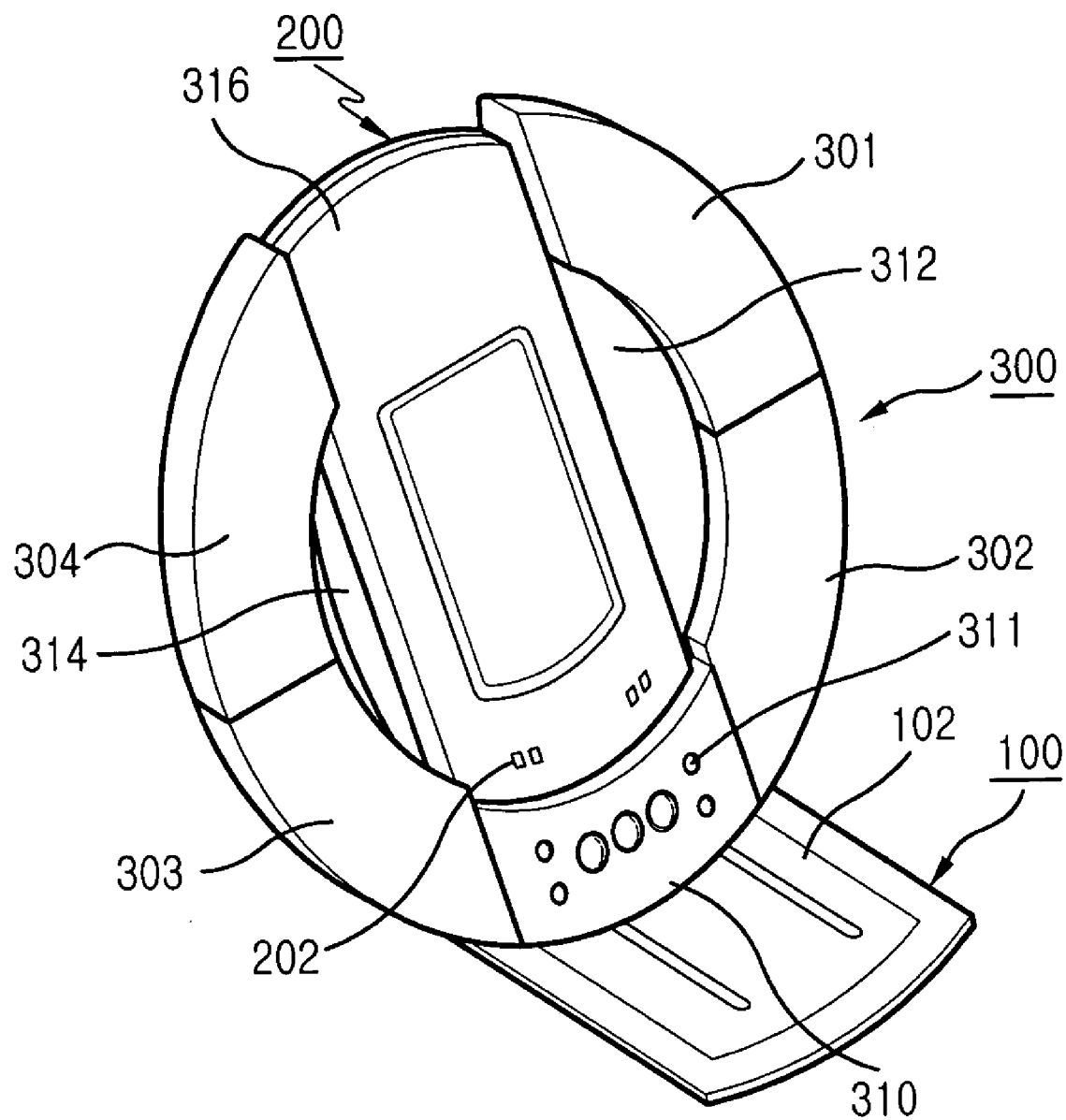
FIG. 1 is a perspective view showing the front side of a charger/cradle combination device for a portable terminal according to a preferred embodiment of the present invention, in which a sliding housing is shown positioned at its highest position, so that the housing has the largest inclined angle.

Hereinafter, preferred embodiments of the present invention will be described with reference to the accompanying drawings. In the following description, a detailed description of known functions and configurations incorporated herein will be omitted when it may make the subject matter of the present invention unclear.

As shown in FIGS. 1 through 4, a charger/cradle combination device according to a preferred embodiment of the present invention: comprises a supporter 100; a sliding housing 150 inclinedly engaged on the supporter 100; sliding means for increasing/decreasing the inclined angle of the sliding housing 150 as the sliding housing is upwardly/downwardly moved on the supporter 100; a cradle housing 200 mounted in confronting relation on the sliding housing 150, the sliding means increasing/decreasing the inclined angle of the cradle housing to as the cradle housing is upwardly/downwardly moved; and a speaker assembly 300 provided on the cradle housing for stabilizing a portable communication device mounted and cradled on the cradle housing 200 to prevent the portable communication device from moving and shaking once it is positioned in the cradle housing 200.

The supporter 100 is located at the lowermost position of the device to be utilized as a desk-top type device. The sliding means functions to adjust the inclined state or angle of the cradle housing 200. The speaker assembly 300 not only prevents a cradled portable terminal from moving or shaking in a side to side manner, but also provides a speaker function for emitting sounds. Alternatively, the speaker assembly 300 may be referred as a holding device.

The cradle housing 200 is connected to be rotatable about a hinge axis while in continuous confronting relation with the sliding housing 150. The hinge axis is provided to be vertically oriented in relation to the bottom surface of the cradle housing 200 and is constructed to be positioned at various distances from the supporting surface on which the device is placed, such as a desk-top or table-top, according to the sliding movement of the sliding housing 150. One or more charging terminals 202 are arranged at a predetermined position on the cradle housing 200; the charging terminals are connected to a charging terminal (not shown) of a cradled battery pack of a cradled portable communication device so as to recharge the battery.

Figure 5:
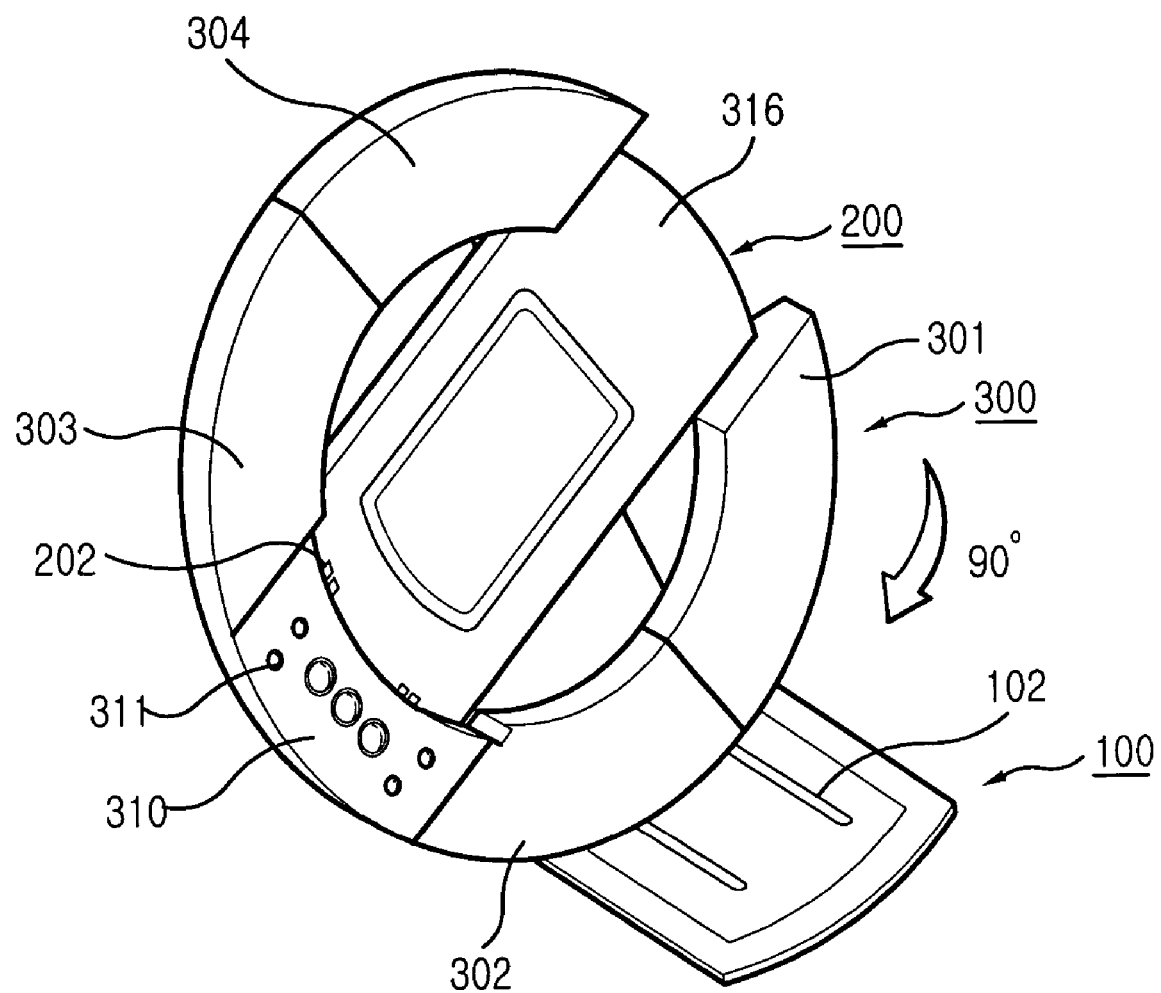
FIG. 5 is a perspective view showing the cradling housing of the charger/cradle combination device according to the present invention rotated about 90 degrees clockwise.

The cradle housing 200 is shown in FIG. 5 in a position after having been rotated about 90 degrees about the hinge axis.

Figure 2:
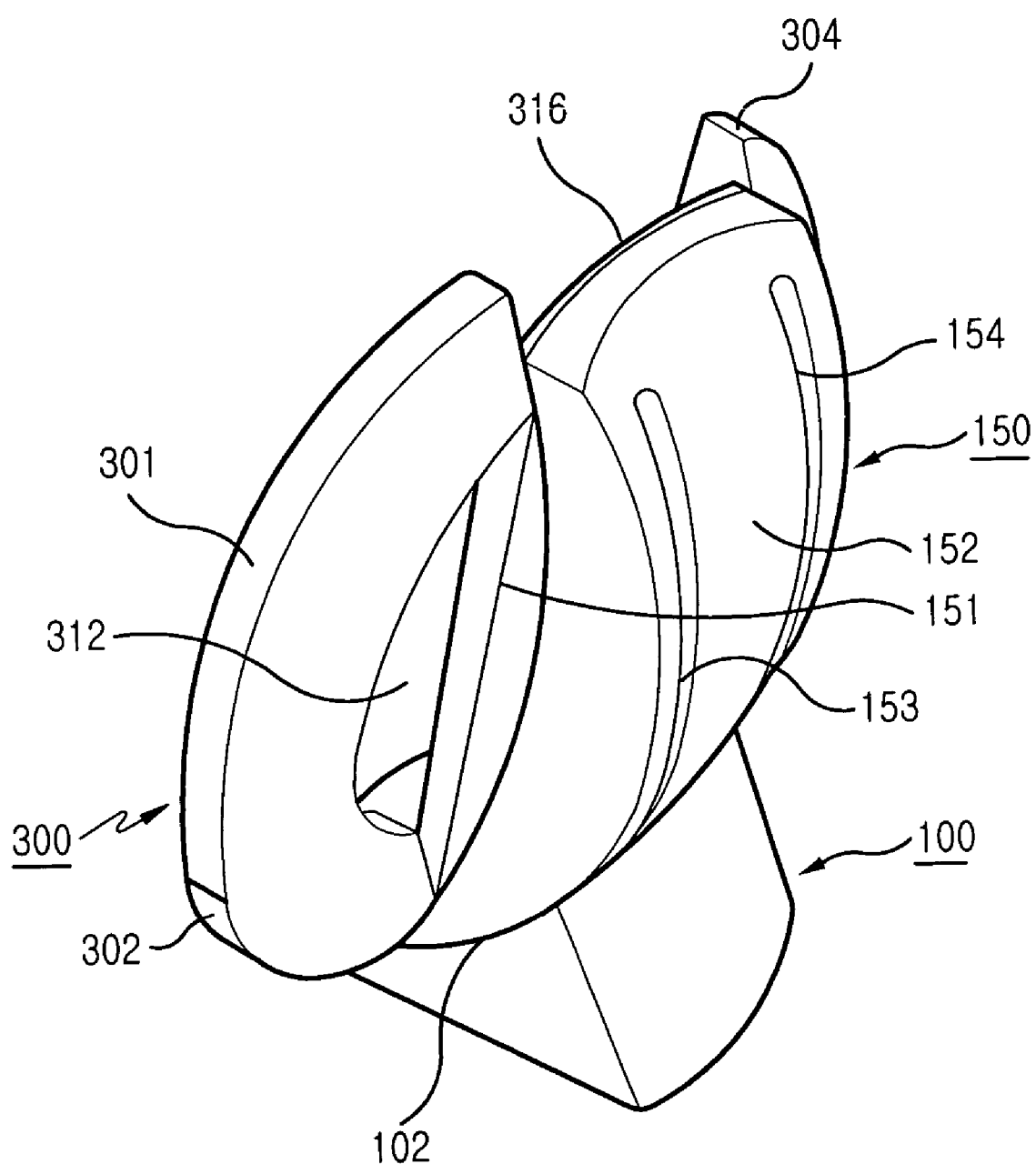
FIG. 2 is a perspective view showing the rear side of the charger/cradle combination device shown in FIG. 1.
Figure 3:
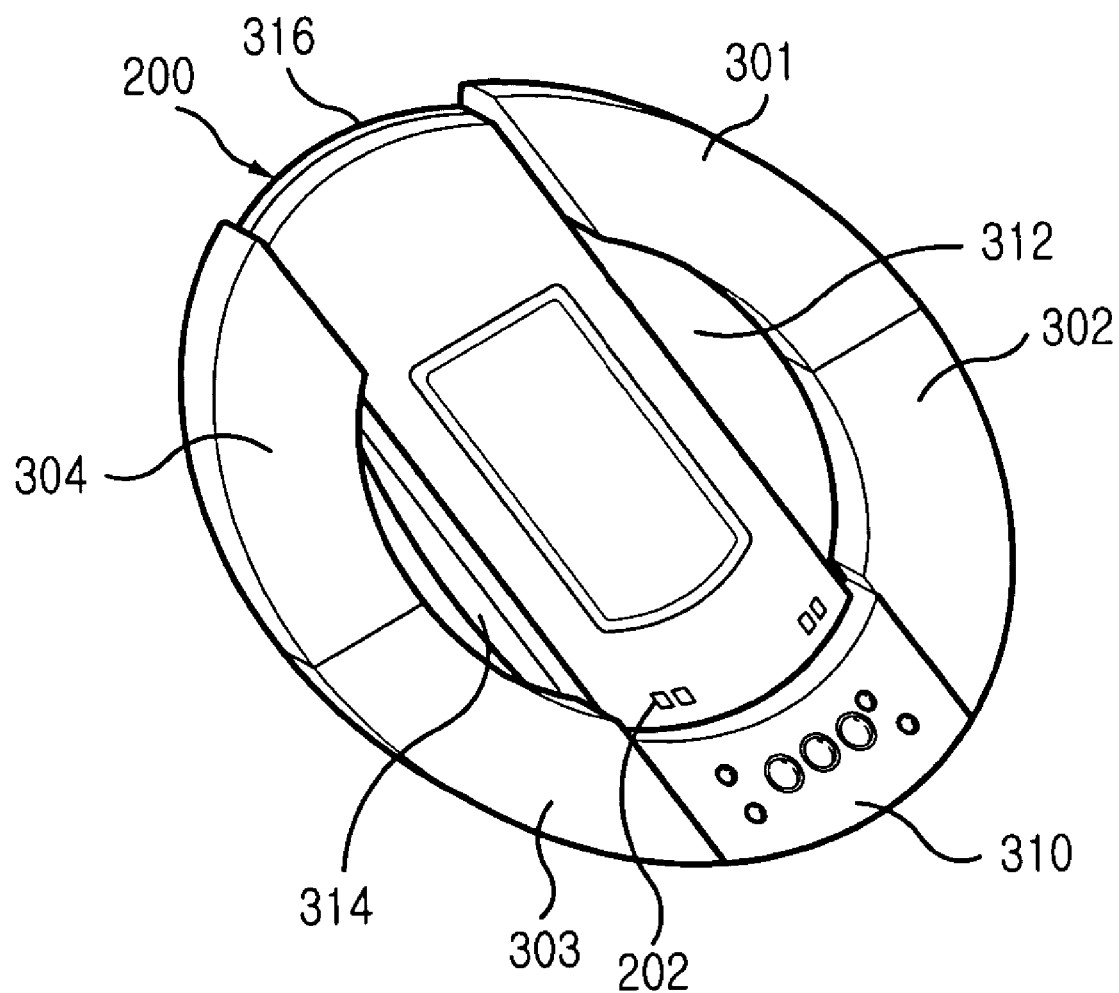
FIG. 3 is a perspective view showing a charger/cradle combination device for a portable communication device according to the preferred embodiment of the present invention, in which a sliding housing is shown positioned at its lowest position, so that the housing has the smallest inclined angle.
Figure 4:
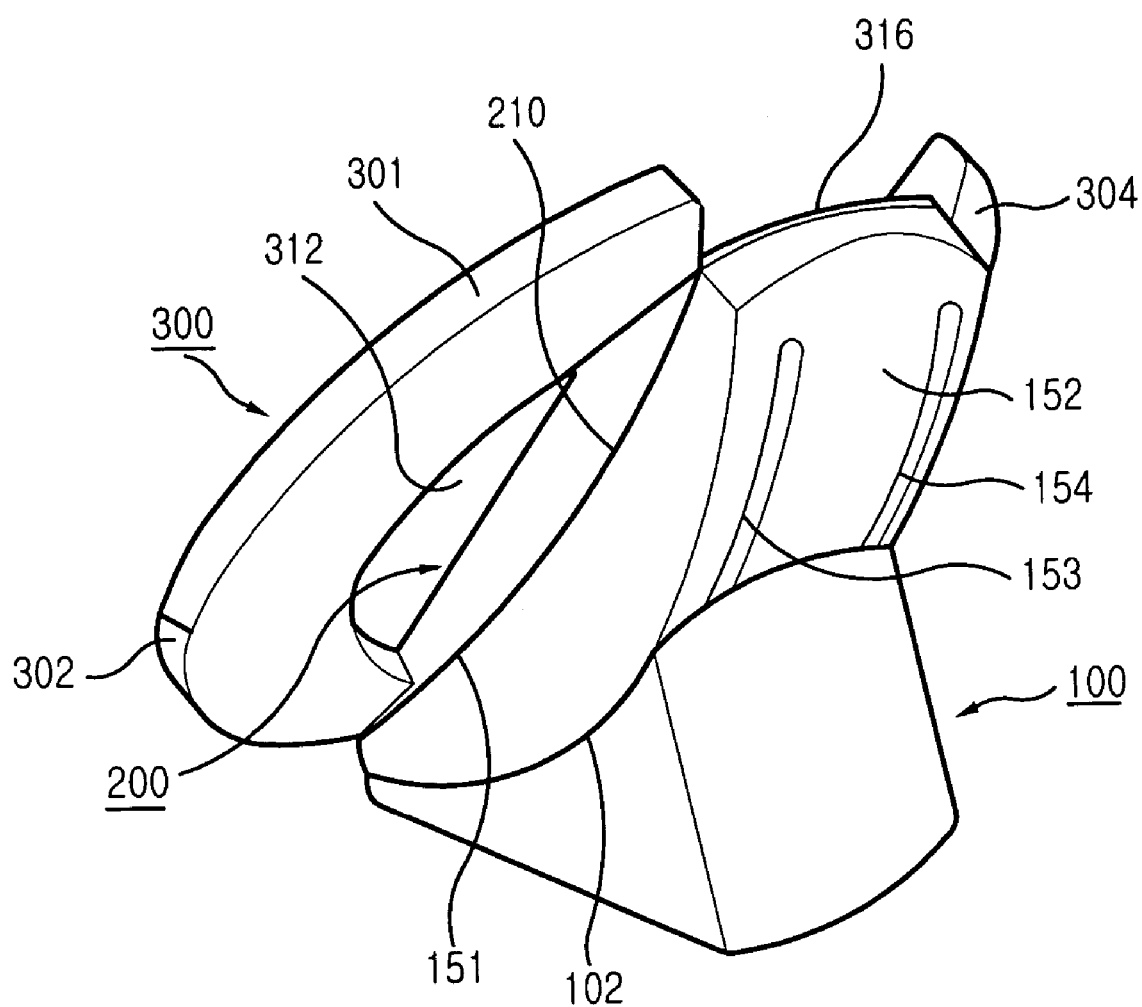
FIG. 4 is a perspective view showing the rear side of the charger/cradle combination device shown in FIG. 3.

FIGS. 1 and 2 show the position the cradle housing 200 as the angle is increased in which the cradle housing 200 is positioned at the top of the sliding surface 102, and FIGS. 3 and 4 show the angle of the cradle housing 200 decreased as the cradle housing 200 is positioned at the bottom of the sliding surface 102. Of course, the inclined angle of the cradle housing 200 can be optionally adjusted if a user pushes the cradle housing 200 or the speaker assembly 300 upward or downward with respect to sliding surface 102.

Preferably, one or more openings 312, 314 and 316 are provided between the cradle housing 200 and the speaker assembly 300. The openings comprise first and second openings 312, 314 symmetrically provided at left and right sides with respect to the cradle housing 200, and a third opening 316 formed on the top end of the cradle housing 200 for accommodating a housing of a portable communication device cradled on the cradle housing.

In addition, the speaker assembly 300 is preferably formed in a "C" shape to surround the cradle housing 200. In addition, the speaker assembly 300 includes a key array 310 comprising an arrangement of a plurality of keys 311. The key array 310 is preferably located substantially at the middle portion of the speaker assembly 300.

Further, the speaker assembly 300 comprises at least two pairs of speakers 301, 302, 303 and 304, and the accompanying drawings illustrate the speaker assembly provided with two pairs of speakers. However, it shall be appreciated that the speaker assembly 300 may comprise one pair of speakers or more than two pairs of speakers. The individual speakers 301, 302, 303 and 304 are symmetrically arranged in the vertical and/or horizontal directions with respect to cradle housing 200. Preferably, the speaker assembly 300 is of a thin-film type and comprises thin-film type speakers.

In addition, the first and second openings 312, 314 are symmetrically provided to the left and right of the cradle housing 200. That is, the first opening 312 is positioned between the cradle housing 200 and the first and second speakers 301, 302 and the second opening 314 is positioned between the cradle housing 200 and the third and fourth speakers 303, 304. In addition, the third opening 316 is positioned between the first and fourth speakers 301, 304.

The sliding means comprises a first curved sliding surface 102 (FIG. 1) formed on the supporter 100, a second curved sliding surface 152 (FIG. 2) formed on the underside of the sliding housing 150 for plane-contact sliding in relation to the first sliding surface 102, and first and second sliding guide slits 153, 154 (FIG. 2) for defining the sliding direction between the supporter 100 and the sliding housing 150. Sliding projections respectively inserted into the first and second sliding guide slits 153 and 154 are not shown in the drawings.

The first sliding surface 102 is concave, while the second sliding surface 152 is convex. In addition, the first and second sliding surfaces 102, 152 are formed in corresponding shapes and radii of curvature so that sliding movement is realized in close plane-contact with each other. In addition, the bottom surface of the cradle housing 200 also forms a sliding surface 151 and conducts sliding rotational movement while remaining in confronting relation with the sliding housing 150.

The individual first and second sliding guide slits 153, 154 are linearly formed in the second sliding surface 152. That is, the first and second sliding guide slits 153, 154 linearly extend along the bottom surface of the sliding housing 150.

As described above, the speaker assembly 300 also serves a holding function. The speaker assembly not only prevents a cradled portable communication device from shaking or shifting in place but also allows rotation of the cradled portable communication device; the key array 310 mounted on the speaker assembly is provided with keys related to turn ON/OFF the device, which may include a T.V. or radio set.

Figure 6:
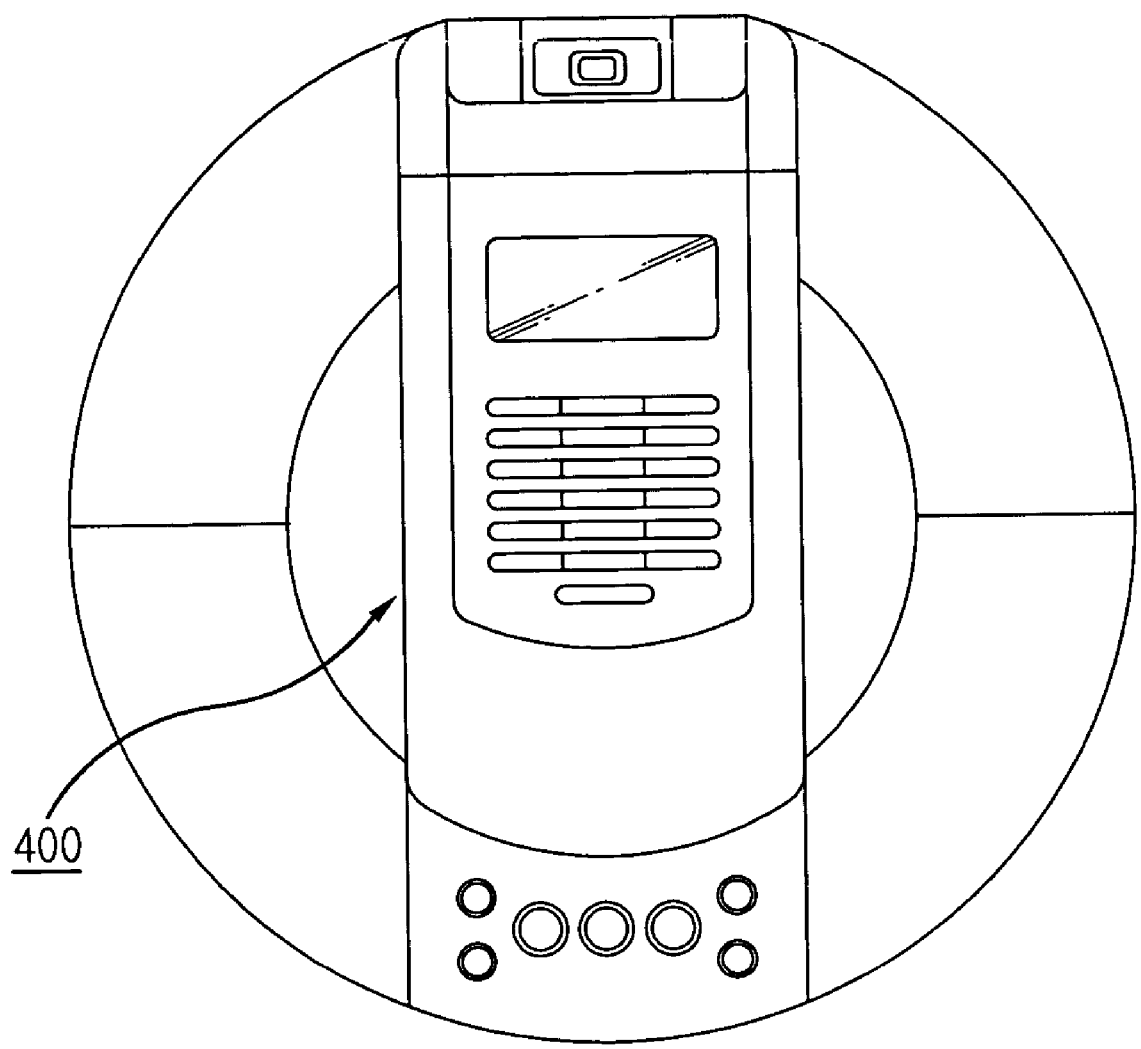
FIG. 6 is a front view showing a composite PDA cradled on the charger/cradle combination device according to the present invention.
Figure 7:
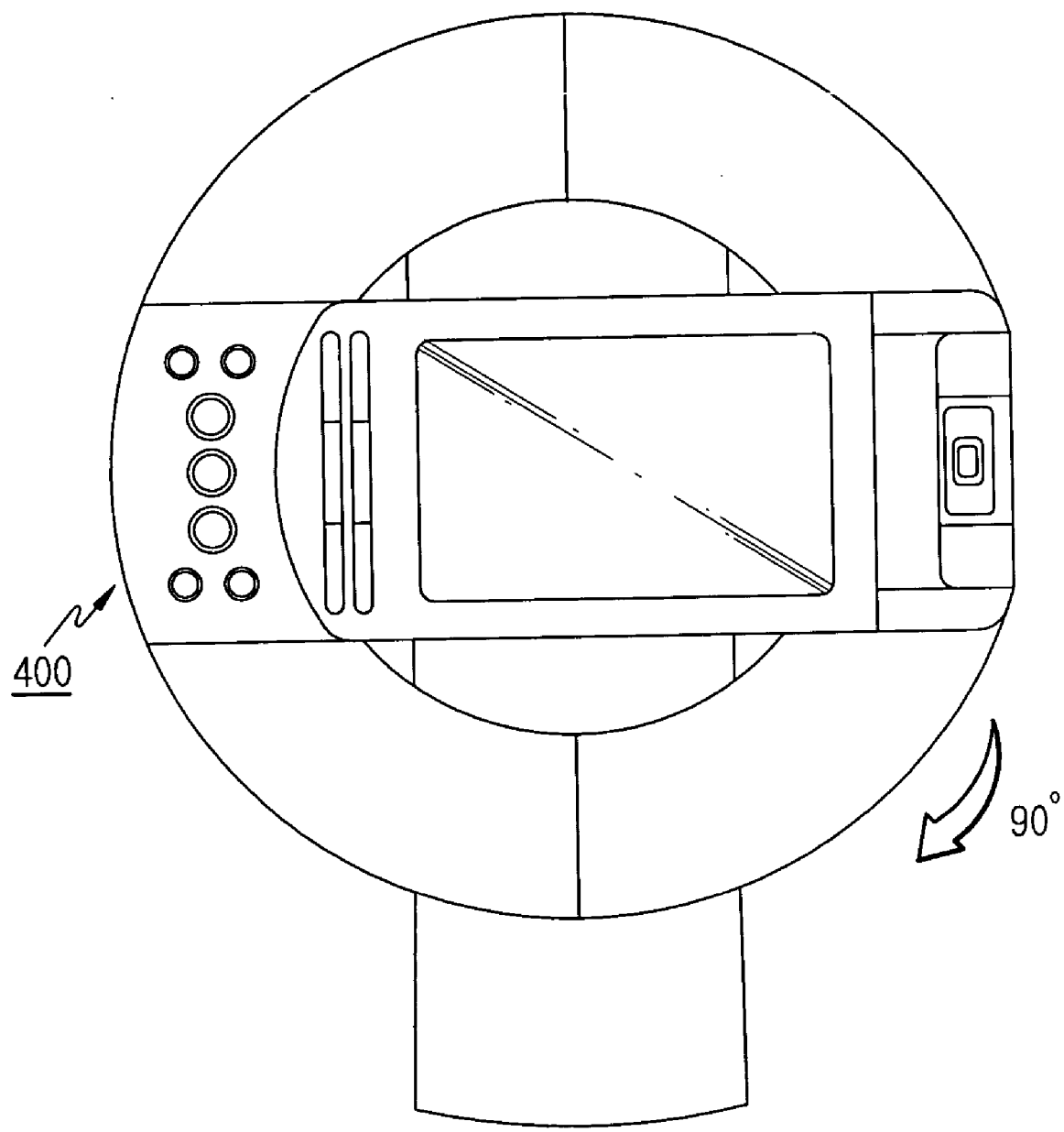
FIG. 7 is a front view showing the cradling housing of the charger/cradle combination device of FIG. 6 rotated about 90 degrees.
Figure 8:
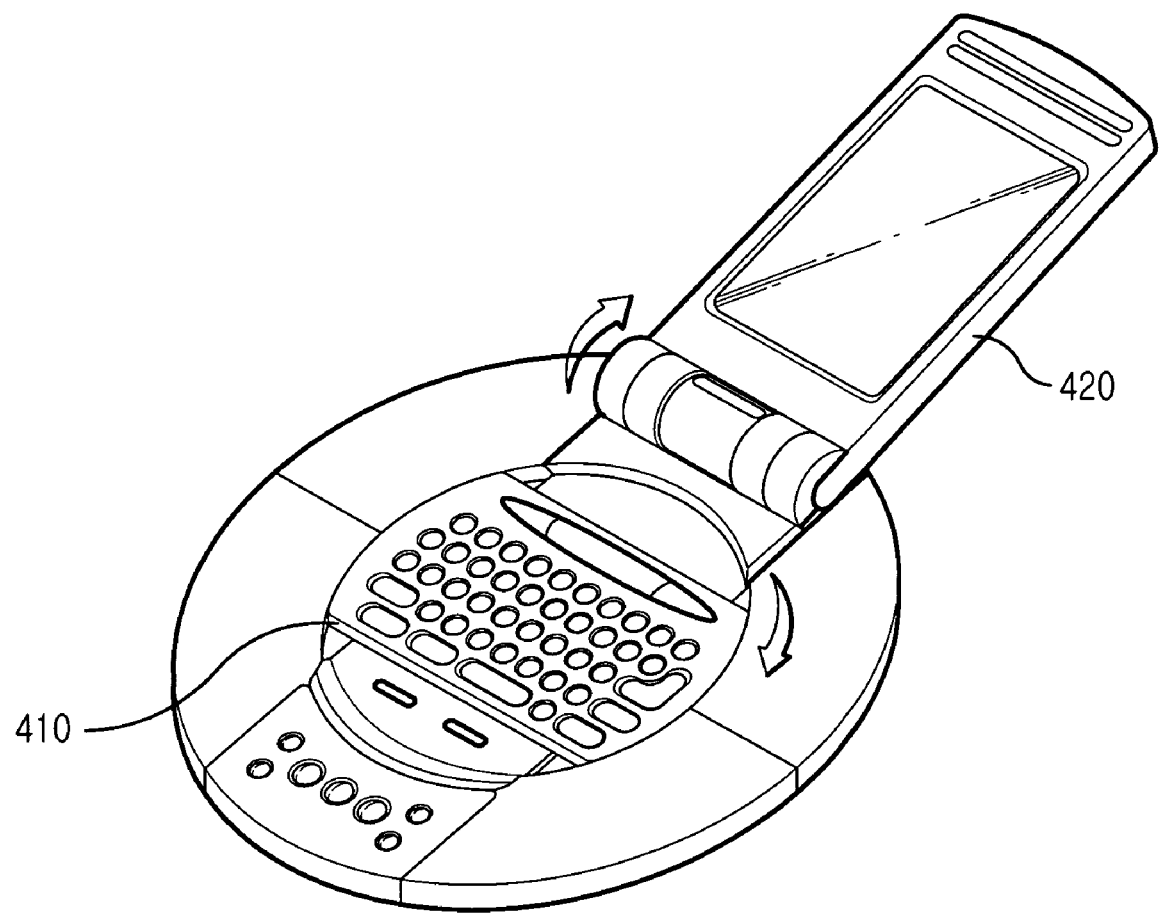
FIG. 8 is a perspective view showing the housings of a portable terminal cradled on the charger/cradle combination device according to the present invention being rotated.

FIG. 6 is a front view showing a portable terminal, in particular a PDA 400, cradled on a charger/cradle combination device according to the present invention. FIG. 7 is a front view showing the PDA 400 rotated about 90 degrees. The user can view the display screen as a wide screen by rotating the cradled portable terminal as desired. In particular, FIG. 7 shows a cradle state in which a video-on-demand or TV-on-demand PDA function can be conveniently watched, while using the key array 310. FIG. 8 is a perspective view showing a housing 420 of a portable terminal cradled on the charger/cradle combination device being opened and another housing 410 cradled or held on the charger/cradle device, with housing 410 of the portable terminal being rotated about 90 degrees, so that the user can conveniently operate keys using both hands.

In addition, signal transmission between the charger/cradle combination device according to the present invention and a portable communication device cradled on the charger/cradle combination device can be executed by way of a wireless communication means such as Bluetooth, IDA (Infrared Data Association), etc., or by wire.

As described above, the present invention makes it more convenient to charge and cradle a portable terminal such as PDA. That is, according to the present invention, a user is able to freely adjust an inclined angle of the terminal in a cradle state and allows a user to conveniently operate keys of the terminal using both hands. In particular, the present invention achieves an advantage in that the keys are very convenient to use because a space for rotating a housing of a PDA is provided. Therefore, the present invention can be suitably applied to a charger/cradle combination device for a portable terminal, which is provided with a sliding/rotating type housing.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A charger/cradle combination device for a portable terminal comprising:
    a supporter;
    a sliding housing engaged at an inclined angle on the supporter;
    sliding means for increasing/decreasing the inclined angle of the sliding housing as the sliding housing is moved upwardly/downwardly on the supporter;
    a cradle housing mounted on the sliding housing confronting relation with the sliding housing, the sliding means increasing/decreasing the inclined angle of the cradle housing as the cradle housing is moved upwardly/downwardly; and
    a holding device provided on the cradle housing for stabilizing a portable communication device cradled on the cradle housing.

2. A charger/cradle combination device as claimed in claim 1, wherein at least one opening is formed between the cradle housing and the holding device.

3. A charger/cradle combination device as claimed in claim 2, wherein the openings comprise:
    first and second openings symmetrically arranged to the left and right of the cradle housing, the first and second openings being surrounded by an inner wall of the holding device; and
    a third opening formed at a top end of the cradle housing for accommodating a portable communication device, thereby allowing housings of the portable communication device cradled on the cradle housing to be opened and closed or rotated.

4. A charger/cradle combination device as claimed in claim 1, wherein the holding device is formed in a "C" shape to surround the cradle housing.

5. A charger/cradle combination device as claimed in claim 1, wherein the holding device includes a key array comprising an arrangement of a plurality keys.

6. A charger/cradle combination device as claimed in claim 1, wherein the sliding means comprises:
   a first curved sliding surface formed on the supporter;
   a second curved sliding surface formed on an underside of the sliding housing in plane-contact sliding relation with the supporter; and
   at least one sliding guide slit for defining a sliding direction between the supporter and the sliding housing.

7. A charger/cradle combination device as claimed in claim 6, wherein the first sliding surface has a concave shape and the second sliding surface has a convex shape, the concave and convex shapes corresponding with each other.

8. A charger/cradle combination device as claimed in claim 6, wherein the sliding guide slits comprise first and second sliding guide slits which extend parallel to one another, the first and second sliding guide slits each being linearly formed on the second sliding surface.

9. A charger/cradle combination device as claimed in claim 1, wherein the cradle housing is rotatable about a hinge axis while maintaining the confronting relation with the sliding housing.

10. A charger/cradle combination device as claimed in claim 9, wherein the hinge axis is provided on an underside of the cradle housing such that the hinge axis is oriented perpendicularly to the underside of the cradle housing and positioned at various distances from the supporter according to the sliding movement of the sliding housing.

11. A charger/cradle combination device for a portable terminal comprising:
   a supporter;
   a sliding housing engaged at an inclined angle on the supporter;
   sliding means for increasing/decreasing the inclined angle of the sliding housing as the sliding housing is moved upwardly/downwardly on the supporter;
   a cradle housing mounted in confronting relation with the sliding housing, and the inclined angle of the cradle housing increases/decreases as the cradle housing is moved upwardly or downwardly; and
   a speaker assembly provided on the cradle housing for stabilizing a portable communication device cradled on the cradle housing to prevent the device from shifting or shaking.

12. A charger/cradle combination device as claimed in claim 11, wherein at least one opening is formed between the cradling housing and the speaker assembly.

13. A charger/cradle combination device as claimed in claim 12, wherein the openings comprise:
   first and second openings symmetrically arranged to the left and right of the cradle housing, the first and second openings being surrounded by an inner wall of the speaker assembly; and
   a third opening formed at the top end of the cradle housing for accommodating the opening and closing of a portable communication device.

14. A charger/cradle combination device as claimed in claim 11, wherein the speaker assembly is formed in a "C" shape to surround the cradle housing.

15. A charger/cradle combination device as claimed in claim 11, wherein the speaker assembly comprises at least one pair of speakers.

16. A charger/cradle combination device as claimed in claim 11, wherein the speaker assembly includes a plurality of speakers symmetrically arranged in the vertical and horizontal directions with respect to the cradle housing.

17. A charger/cradle combination device as claimed in claim 16, wherein the speakers are thin-film type speakers.

18. A charger/cradle combination device as claimed in claim 11, wherein the speaker assembly includes a key array consisting of an arrangement of a plurality keys.

19. A charger/cradle combination device as claimed in claim 11, wherein the sliding means comprises:
   a first curved sliding surface formed on the supporter;
   a second curved sliding surface formed on an underside of the sliding housing in plane-contact sliding relation with the supporter; and
   at least one sliding guide slit for defining a sliding direction between the supporter and the sliding housing.

20. A charger/cradle combination device as claimed in claim 19, wherein the first sliding surface has a concave shape and the second sliding surface has a convex shape, the concave and convex shapes corresponding with each other.

21. A charger/cradle combination device as claimed in claim 19, wherein the sliding guide slits comprise first and second sliding guide slits which extend parallel to one another, the first and second sliding guide slits each being linearly formed on the second sliding surface.

22. A charger/cradle combination device as claimed in claim 11, wherein the cradle housing is rotatable about a hinge axis while maintaining the confronting relation with the sliding housing.

23. A charger/cradle combination device as claimed in claim 22, wherein the hinge axis is provided on an underside of the cradle housing such that the hinge axis is oriented perpendicularly to the underside of the cradle housing and positioned at various distances from the supporter according to the sliding movement of the sliding housing.

* * * * *